United States Patent
Bremer

[19]

[11] Patent Number: 6,111,936
[45] Date of Patent: Aug. 29, 2000

[54] METHOD AND APPARATUS FOR AUTOMATICALLY DETECTING AND MEASURING DISTORTION IN A DSL SYSTEM

[75] Inventor: Gordon Bremer, Clearwater, Fla.

[73] Assignee: Paradyne Corporation, Largo, Fla.

[21] Appl. No.: 09/239,636

[22] Filed: Jan. 28, 1999

Related U.S. Application Data

[60] Provisional application No. 60/072,792, Jan. 28, 1998.

[51] Int. Cl.[7] .................................................. H04M 1/24
[52] U.S. Cl. ..................... 379/28; 379/6; 379/1; 379/27; 379/29
[58] Field of Search .......................... 379/6, 10, 12, 379/21, 22, 23, 24, 26, 27, 28, 29, 32, 1, 30, 5, 31

[56] References Cited

U.S. PATENT DOCUMENTS

| | | | |
|---|---|---|---|
| 4,918,623 | 4/1990 | Llockitt et al. | 379/6 |
| 5,166,954 | 11/1992 | Grizmala et al. | 379/6 |
| 5,397,992 | 3/1995 | Hill | 379/6 |
| 5,475,315 | 12/1995 | Cabot | 379/6 |
| 5,515,398 | 5/1996 | Walsh et al. | 379/6 |
| 5,579,369 | 11/1996 | Feiner et al. | 379/6 |
| 5,598,455 | 1/1997 | Bliven et al. | 379/27 |
| 5,649,304 | 7/1997 | Cabot | 379/6 |
| 5,652,782 | 7/1997 | Hughes-Hartogs | 379/27 |
| 5,672,974 | 9/1997 | Turner | 379/6 |
| 5,805,669 | 9/1998 | Bingel et al. | 379/28 |
| 5,881,130 | 3/1999 | Zhang | 379/30 |
| 6,014,425 | 1/2000 | Bingel et al. | 379/27 |
| 6,038,425 | 4/1990 | Jeffrey | 455/3.1 |

*Primary Examiner*—Curtis A. Kuntz
*Assistant Examiner*—Rexford M Barnie
*Attorney, Agent, or Firm*—Thomas, Kayden, Horstemeyer & Risley, L.L.P.

[57] ABSTRACT

In a communications environment where it is desirable to allow the simultaneous transmission of digital subscriber line (DSL) signals and conventional Plain Old Telephone Service (POTS) signals on a single two-wire communication line, a method and apparatus is configured to automatically measure the distortion caused by a telephone or other attached device such as a dial modem due to the presence of a DSL signal on the same communication line. The method and apparatus of the present invention allows DSL devices and POTS devices to be used on the same communication line without the use of a splitter.

19 Claims, 8 Drawing Sheets

METHOD AND APPARATUS FOR AUTOMATICALLY DETECTING AND MEASURING DISTORTION IN A DSL SYSTEM

CROSS REFERENCE TO RELATED APPLICATIONS

This application claims priority to and the benefit of the filing date of co-pending and commonly assigned provisional application entitled AUTOMATICALLY IDENTIFYING THE NEED FOR A PHONE FILTER IN A DSL SYSTEM, assigned Ser. No. 60/072,792, filed Jan. 28, 1998, and hereby incorporated by reference. The present application is also related to copending application entitled METHOD AND APPARATUS FOR AUTOMATICALLY AND ADAPTIVELY ADJUSTING TELEPHONE AUDIO QUALITY AND DSL DATA RATE IN A DSL SYSTEM, filed on even date herewith, under express mail no. ELO68409204US.

TECHNICAL FIELD

The present invention relates generally to communication devices, and more particularly, to a method and apparatus for automatically detecting and measuring distortion in a communications systems that includes digital subscriber line (DSL) signals and conventional telecommunications signals.

BACKGROUND OF THE INVENTION

In the field of data communications, modems are used to convey information from one location to another. digital subscriber line (DSL) technology now enables DSL devices, such as DSL modems, to communicate large amounts of digital data. Typically in a communications environment, Plain Old Telephone Service (POTS) type devices (such as telephones, facsimile machines, and dial modems) conveying conventional telecommunications signals are connected to the same subscriber wire pair as DSL devices at the user's location, which is typically remote from the telephone company's central office location, via a wire pair provided by the local telephone company.

Because passband DSL signals, such as asymmetric digital subscriber line (ADSL) and rate adaptive digital subscriber line (RADSL) modem signals, typically occupy only the frequency band above the audio band, these DSL signals have traditionally been isolated from all POTS type devices (such as telephones or dial modems) by a splitter or filter system installed at the user (remote) location. Such a splitter is typically known in the field of telephony communications as a POTS splitter. The POTS splitter typically serves two purposes: (1) it attenuates the DSL signals so that they do not significantly appear at the input of the POTS devices, and (2) it attenuates the POTS signals so that they do not significantly appear at the input of the DSL devices. In particular, the POTS filter attempts to attenuate DSL signals appearing at the input of the POTS devices in the audio band to an inaudible level, and also attempts to attenuate DSL signals above the audio band to a level low enough so that distortion inside the POTS type devices does not adversely affect their performance.

Although POTS splitters have been effective, such splitters are undesirable for many applications because of installation and cost issues. Recognizing the undesirable attributes of POTS splitters, efforts to eliminate them have begun in the DSL industry and standards bodies. These attempts call for "splitter-less-DSL" systems wherein the DSL devices and the POTS devices are all directly connected to the two-wire communications channel without the use of a POTS splitter.

In splitter-less operation, it is necessary for the DSL device to: (1) filter its output signal to ensure that signals in the audio band are below an audible level, and (2) reduce its output (transmit) signal power to a level that does not cause adverse distortion in the POTS devices. The reduction in output signal power is a crucial aspect of splitter-less operation. Unfortunately, such reduction may dramatically reduce data performance, in some cases to an unacceptable level. Due to line losses, reduction in the output signal power level also reduces the reach of the subscriber loop.

To facilitate production of a splitter-less DSL device, such as a DSL modem, that can be installed in a variety of systems without field adjustment, the DSL device transmit level must be pre-set to the lowest level commensurate with the worst distortion situation expected for the potential universe of attached POTS devices. As noted above, such a reduced output level may be undesirable in many installations. Although many installations might tolerate a higher output level, this level could only be determined by trial and error for each installation, which is a cumbersome process and impractical for mass deployment of DSL splitter-less devices for consumer applications.

Due to the problems involved in using many DSL devices in splitter-less operation, it has been proposed that phone filters (also known as distributed POTS splitters) be placed at the interface to each item of POTS type equipment at the remote location. A phone filter is a bi-directional lowpass filter that attenuates as much of the DSL modem signal as practical and prevents it from appearing at the interface to the POTS type devices, such as telephones and dial modems. A phone filter can markedly improve splitter-less operation by permitting the transmit power level of the DSL device to be increased above the level that would produce distortion in splitter-less operation. However, phone filters also have cost and installation drawbacks and they are less suitable for some types of DSL operation than a system utilizing a POTS splitter. Thus, it is desirable to eliminate phone filters where they are not required, for example on a particular POTS device that is immune to distortion.

Therefore, there is a need in the industry for a method and apparatus for determining at a DSL device whether the distorting effects of the DSL device's transmit signal warrant the incorporation of a phone filter at the interface to each POTS device in the system. There is also a need to be able to make such determinations at both the user (remote) end and at the central site end of the two-wire communications channel.

SUMMARY OF THE INVENTION

A technique is presented that permits a DSL-type device on a wire-pair communication channel to automatically identify a POTS-type device (such as a telephone or dial modem) on that same wire pair that, in the presence of a DSL-type line signal, is causing distortion either: (1) detrimental to the data performance of the DSL-type device; (2) likely to be detrimental to the audio quality of the telephone and telephone system including the introduction of audio noise; or (3) detrimental to the data rate performance of the dial modem. Such identification may be used to denote the need for placement of a phone filter in the wire pair prior to the POTS-type devices, which would reduce the detrimental effects of the DSL signal.

The technique utilizes the fact that certain envelope-modulated or time-gated DSL-type passband signals cause certain predicable audio frequency band signals on the wire pair connected to a distorting POTS-type device, such as a telephone or dial modem, and that these audio frequency band signals can be detected and quantified in the DSL-type device, even in the presence of other audio signals that ordinarily occur on the wire pair channel. The technique is implemented by varying the output signal of a DSL-type device on the wire pair channel according to a time sequence to produce a time-varied DSL signal, measuring the audio frequency band distortion on the communication channel in the presence of the time-varied DSL signal, and correlating the audio frequency band distortion on the wire pair channel to the time sequence of the time-varied DSL signal.

BRIEF DESCRIPTION OF THE SEVERAL VIEWS OF THE DRAWINGS

The present invention, as defined in the claims, can be better understood with reference to the following drawings. The drawings are not necessarily to scale, emphasis instead being placed on clearly illustrating the principles of the present invention.

DETAILED DESCRIPTION OF THE INVENTION

The present invention can be implemented in software, hardware, firmware, or a combination thereof. In the preferred embodiment, the elements of the present invention are implemented in software that is stored in a memory and that configures and drives a suitable digital signal processor (DSP) situated in the respective DSL-type device. However, the foregoing software can be stored on any computer-readable medium for use by or in connection with any suitable computer-related system or method. In the context of this document, a computer-readable medium is an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CD-ROM) (optical). Note that the computer readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 1:
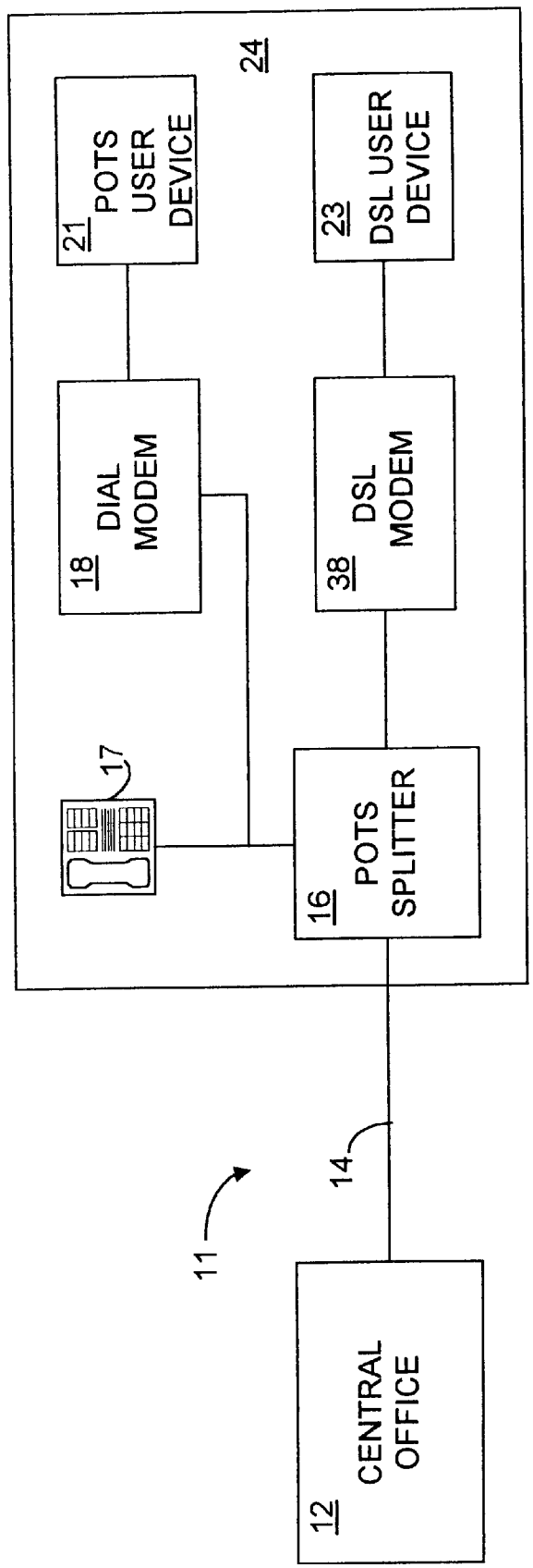
FIG. 1 is a schematic view illustrating a prior art communications environment in which a POTS splitter is employed to isolate a DSL device from conventional POTS-type devices.

FIG. 1 is a schematic view illustrating a prior art communications environment 11. Communications channel 14 is a conventional two-wire communications system that typically connects a telephone company central office location 12 to a remote user location 24. Remote user location 24 is typically a residential or business location and includes POTS devices such as telephone 17, dial modem 18, and user device 21, as well as DSL devices, such as DSL modem 38 and user device 23. A POTS splitter 16 is employed to connect the telephone 17, dial modem 18, and DSL modem 38 to the communications channel 14. POTS splitter 16 is required in this application in order to isolate the telephone 17 and dial modem 18 from the DSL modem 38. POTS splitter 16 is typically located at remote location 24.

The POTS splitter 16 typically serves two purposes: (1) it attenuates the DSL signals so that they do not significantly appear at the input of the telephone 17 or dial modem 18, and (2) it attenuates the telephone 17 or dial modem 18 transmit signals so that they do not significantly appear at the input of the DSL modem 38. In particular, the POTS splitter 16 attempts to attenuate the DSL modem 38 signals appearing at the telephone 17 or dial modem 18 input in the audio band to an inaudible level, and also attempts to attenuate DSL modem 38 signals above the audio band to a level low enough so that distortion in the telephone 17 or dial is modem 18 does not adversely affect their performance.

Figure 2:
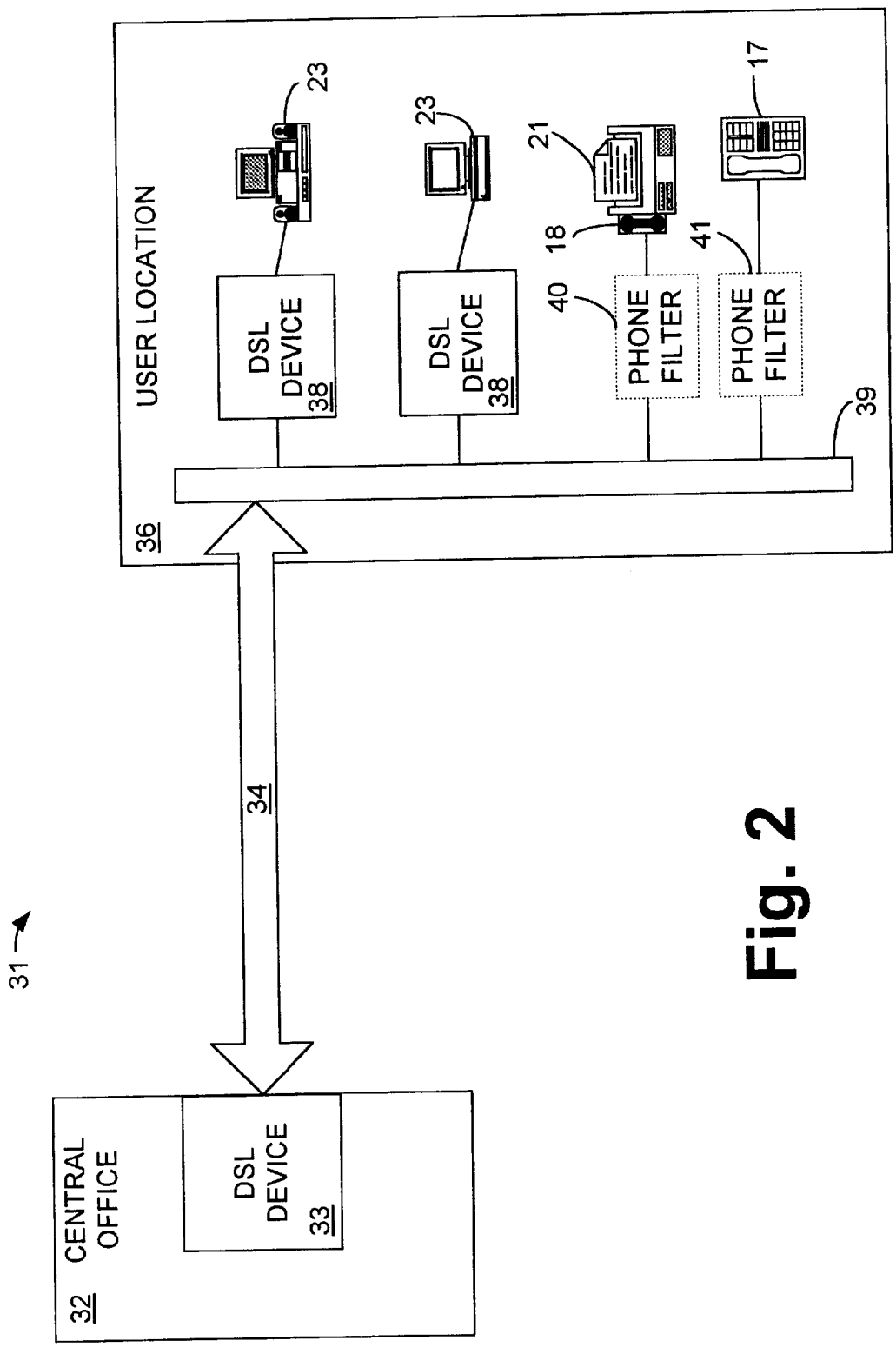
FIG. 2 is a schematic view of a multipoint communications environment including DSL devices employing the automatic distortion detection and measurement method and apparatus of the present invention.

FIG. 2 is a schematic view of a multipoint communications environment 31 in which POTS devices 17 and 18, and DSL devices 33 and 38 operate. In this figure, the DSL devices 33 and 38 employ the automatic distortion detection and measurement method and apparatus of the present invention. Notably, communications environment 31 does not include a POTS splitter. Optional phone filters 40 and 41 may be used to reduce distortion, as discussed hereinafter.

User location 36 is connected to central office location 32 via communication channel 34. DSL device 33 is located at central office location 32, while at least one DSL device 38 is located at the user location 36, which is remote from central office location 32. Communication channel 34 is typically the two-wire communication channel that extends between a telephone company central office and a remote residential, business, or any other location served by local telephone service. Remote location 36 may contain a plurality of remote DSL devices 38 connecting a plurality of user devices 23 to communication channel 34 via communication bus 39. Communication bus 39 is illustratively the wiring infrastructure used throughout a remote location to connect remote DSL devices 38 to communication channel 34. In addition, remote location 36 may contain conventional POTS devices 17 and 18. Illustratively, conventional telephone 17 and dial modem 18 (which is not shown in FIG. 2, but is included within user device 21, which is illustratively a facsimile machine) are connected to communication bus 39, and thus to communication channel 34. By using DSL device 33 and remote DSL devices 38 employing the concepts and features of the automatic distortion detection and measuring apparatus and method of the present invention, it is possible in some instances to connect POTS devices 17 and 18 directly to communication channel 34 without experiencing audible distortion. If the distortion detection and measurement method and apparatus of the present invention indicates an unacceptable level of distortion at the output of DSL devices 38, optional phone filters 40 and 41 may be used to reduce the distortion at POTS devices 17 and 18 to acceptable levels.

Figure 3:
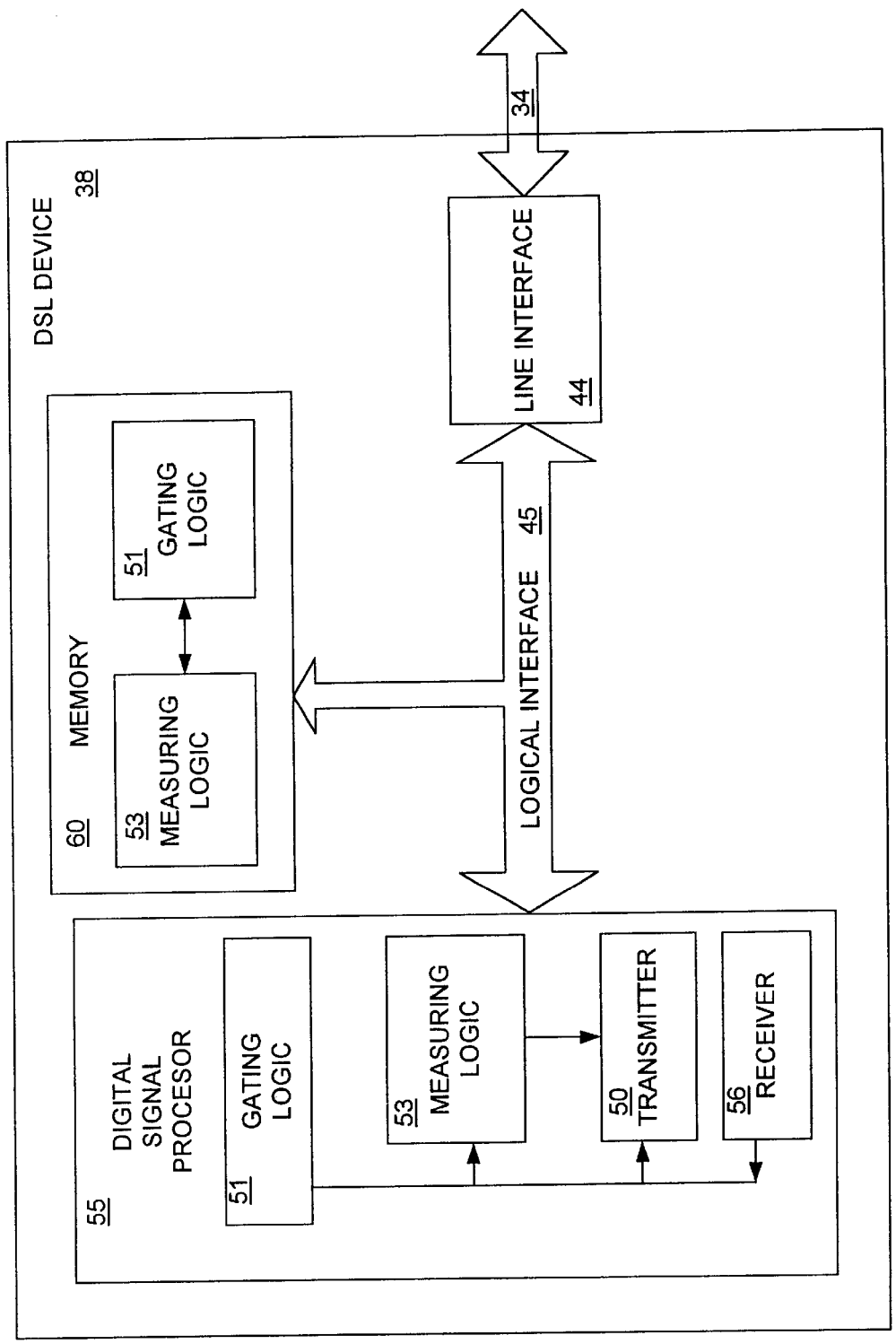
FIG. 3 is a simplified schematic view of a DSL device of FIG. 2 employing the automatic distortion detection method and apparatus of the present invention.

Now referring to FIG. 3, shown is a schematic view illustrating DSL device 38 of FIG. 2, including the distortion detection and measuring logic 53 of the present invention. Typically, DSL device 38 will transmit signals to the central office 32 of FIG. 2 over communication channel 34. Similarly, central office 32 will transmit signals to DSL device 38. DSL device 38 contains conventional components as are known in the art of data communications. Digital signal processor (DSP) 55 controls the operation of and includes transmitter 50 and receiver 56 of DSL device 38. DSP 55 couples through logical interface 45 to line interface 44 to gain access to communication channel 34. Also included in DSP 55 of DSL device 38 are gating logic 51, and distortion detection and measuring logic 53, which enable DSL device 38 to perform the distortion detection and measurement functions of the present invention, as discussed hereinbelow. Also contained within DSL device 38 is memory 60, which also includes gating logic 51, and distortion detection and measuring logic 53. In a preferred embodiment, the logic of the present invention is executed within DSP 55 and is therefore shown as residing in both memory 60 and DSP 55.

Still referring to FIG. 3, the output (transmit) DSL signal of DSL device 38 is passed to communication channel 34 (via logical interface 45 and line interface 44) from transmitter 50. Transmitter 50 is controlled by gating logic 51, which varies the DSL signal according to a time sequence. The output of transmitter 50 is a gated DSL output signal, which is a time-varied representation of the original non-gated DSL transmit signal. Distortion detection and measuring logic 53 is coupled to line interface 44, as well as being correlated with the time sequence of gating logic 51. Optionally (and not shown in the figures), distortion detection and is measuring logic 53 may also reside in central DSL device 33 of FIG. 2. However, for simplicity, the present invention is described with reference to remote DSL device 38.

Gating logic 51, and distortion detection and measuring logic 53, may be configured in software, hardware, firmware, or a combination thereof. For example, gating logic 51 may be implemented in hardware by such components as a modulator or a simple logic gate. Elements 51 and 53 are used to implement DSP sequencing and correlation algorithms which are known in the art of data communications, and which are used to detect and measure distortion in the communications channel, as set forth in the following discussion. The following discussion assumes an off-hook telephone or dial modem. However, the concepts may be applied to on-hook devices as well.

The following discussion illustrates how the apparatus of FIGS. 2 and 3 is used to detect and measure distortion in the communications channel.

Figure 4A:
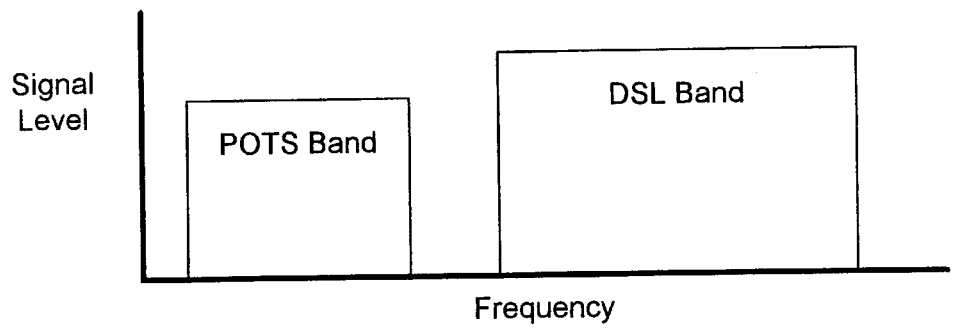
FIGS. 4A–4C are simplified illustrations of the signal level and frequency placement of POTS band signals and DSL band signals on the two-wire communications channel of FIG. 1.
Figure 4B:
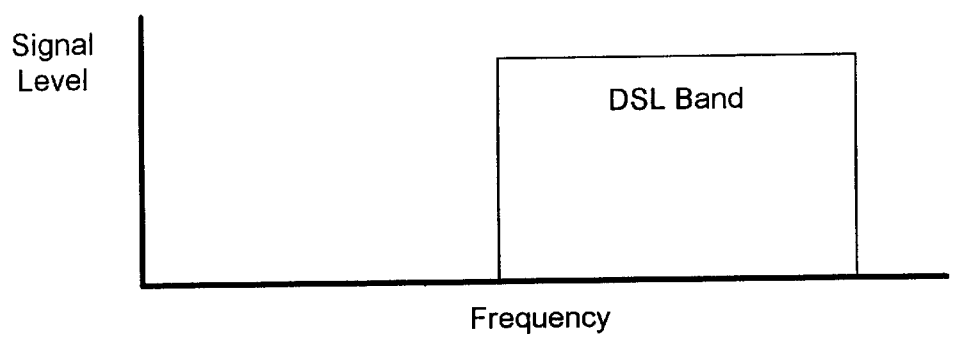
Figure 4C:
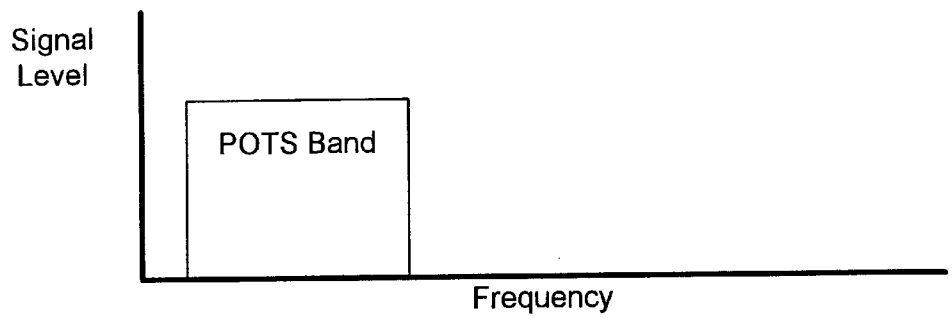

FIG. 4A illustrates an ideal frequency placement of the telephone and dial modem signals (POTS band) and the DSL modem signals (DSL band) on the two-wire communications channel 14 of FIG. 1, wherein a POTS splitter has been used. Note that there is no overlap between the POTS band signals and the DSL band signals. FIG. 4B illustrates the signal at the DSL modem 38 interface wherein the POTS band signal has been filtered by the POTS splitter. FIG. 4C illustrates the signal at the telephone 17 or dial modem 18 interface wherein the DSL signal has been filtered by the POTS splitter.

Figure 5:
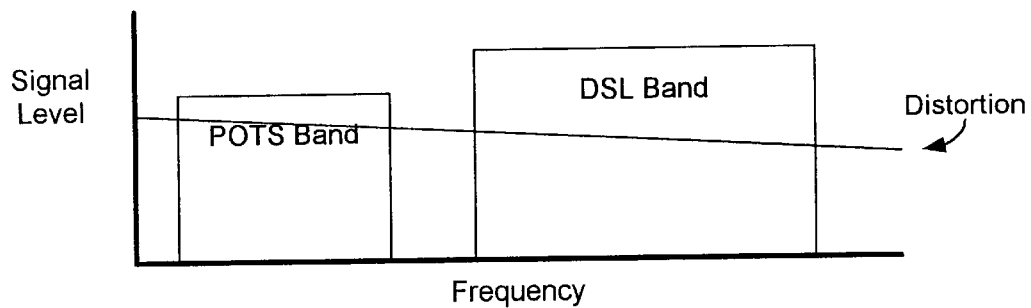
FIG. 5 is a simplified illustration of the signal level and frequency placement of POTS band signals, DSL band signals, and distortion on the two-wire communications channel of FIG. 2, in which a phone filter is not used.

FIG. 5 illustrates the signal on the two-wire channel of the communications channel 34 of FIGS. 2 and 3, without the use of phone filters 40 and 41. In this case, the DSL signal causes non-linear distortion at the telephone 17 or dial modem 18 interface. Because the DSL signal is a time-continuous signal (that is the envelope of the DSL signal is time-stationary), the distortion products are also time-continuous and appear as wide band noise across all frequency bands. Thus, the net signal on the two-wire channel is composed of the POTS signal, the DSL signal, and the distortion signal. This distortion has a direct effect on the DSL performance of DSL device 38 due to the unwanted signal components in the DSL band. The distortion more importantly is found to cause unacceptable audio noise in telephone 17 and reduces the performance of dial modem 18 due to the unwanted signal components in the dial modem signal. The distortion actually heard in a telephone speaker may exceed that indicated in FIG. 5 due to even further distortion within the telephone circuitry which is blocked from appearing at the telephone interface. The distortion also may have frequency content that is different than that indicated in FIG. 5.

Figure 6:
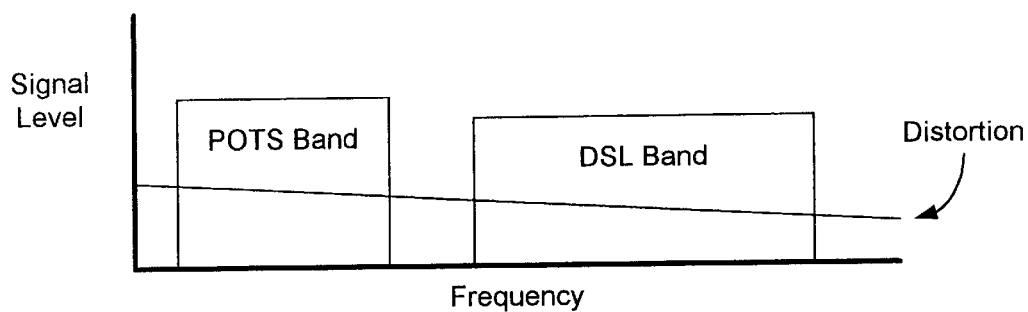
FIG. 6 is a simplified illustration of the signals of FIG. 5 measured at the conventional telephone interface, where a phone filter has been used to reduce the level of the DSL signal, and hence the distortion.

FIG. 6 shows the signal at the telephone 17 interface in the splitter-less DSL system of FIGS. 2 and 3 wherein optional phone filters 40 and 41 are used to reduce the amplitude of the DSL signal. In particular, the phone filter reduces the level of the DSL signal at the telephone which in turn reduces the distortion, typically by a reduction factor that is larger than the reduction factor of the DSL signal itself. As shown in FIG. 6, this reduces the level of distortion in both the POTS band and the DSL band.

With further reference to FIG. 6, it should be noted that both the DSL signal envelope and the POTS signal envelope at the dial modem 18 are time-stationary. That is, both signals are present at all times. However, a telephone voice signal is typically not time stationary because the POTS signals representing speech vary greatly in amplitude when viewed over seconds or minutes and the signal may be effectively absent. Thus, the POTS band signal may at times be absent.

Figure 7:
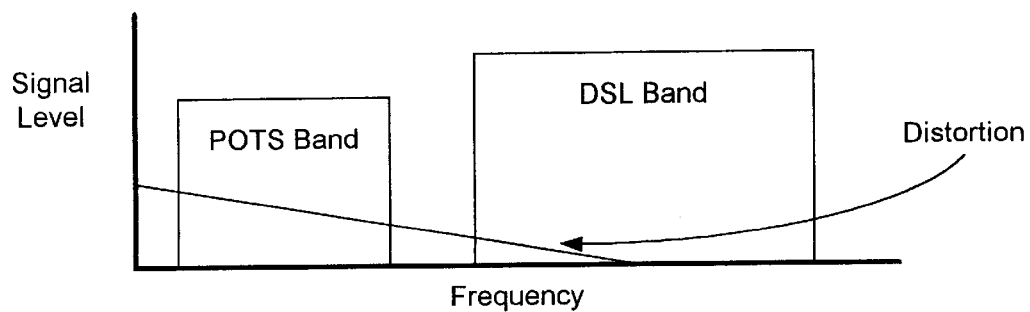
FIG. 7 is a simplified illustration of the signals of FIG. 5 measured at the DSL device, where a phone filter has been used to reduce the level of the DSL signal, and hence the distortion.

FIG. 7 illustrates the signal at DSL device 38 of FIGS. 2 and 3 in the presence of the effects illustrated in FIG. 6. In FIG. 7, both the POTS band signal components produced by POTS devices 17 and 18 appear directly because the low-pass effect of phone filters 40 and 41 does not attenuate the POTS band. However, the DSL band distortion component is reduced due to the lowpass filtering of the phone filters 40 and 41 and the DSL band signal level is increased because this signal is the unattenuated DSL signal. The distortion in the POTS band is observable at the DSL device 38. Because the communication channel 34 passes the POTS band signals and the distortion components with equal attenuation, the distortion in the POTS band is also observable at DSL device 33.

As set forth below, it is possible to detect and quantify the distortion components illustrated in FIG. 4 at DSL device 33 and DSL device 38.

The POTS band signal component due to telephone audio or due to a dial modem is not practically separable from the POTS band distortion component because the distortion component, which is originally caused by the DSL signal, is smaller in amplitude than the telephone audio or dial modem component. Thus, there is no practical ability for the DSL device to correlate the distortion component with a DSL signal so that it can be extracted. A possible exception that would allow detection would be to measure the distortion component when a telephone signal is silent. This is impractical, however, because there is no guarantee of silence and because the level of distortion to be measured is very small and not dissimilar to the amplitude of signals due to telephone background noise.

The distortions illustrated in FIGS. 5 through 7 are due to the time stationary DSL signals. However, if the signal envelope of the DSL signals is varied with time, the DSL signals become non-stationary. The non-linear distortion caused by such non-stationary signals at a POTS device, such as a telephone or dial modem, is fundamentally different from the distortion that results from time stationary DSL signals.

When the signal envelope of the DSL transmit signals is varied according to a time sequence (by gating logic 51 of FIG. 3), the nonlinear distortion components at the telephone or dial modem interface are correlated to that sequence. In a preferred embodiment of the invention, the DSL transmit signals are time-varied by gating the output (transmit) signals of the DSL device on and off. Gating of the DSL signals according to a time sequence causes nonlinear distortion components at the telephone or dial modem interface that are correlated to the time sequence and in fact occur coincident in time with the gating.

Such gating can be applied to a standard DSL signal in a (short duration) distortion test mode wherein measurement takes place at the sacrifice of data communication. Alternatively, such gating may be inherent in certain DSL signaling, such as half duplex signaling, in which case non-interruptive and adaptive measurement can take place.

Figure 8:
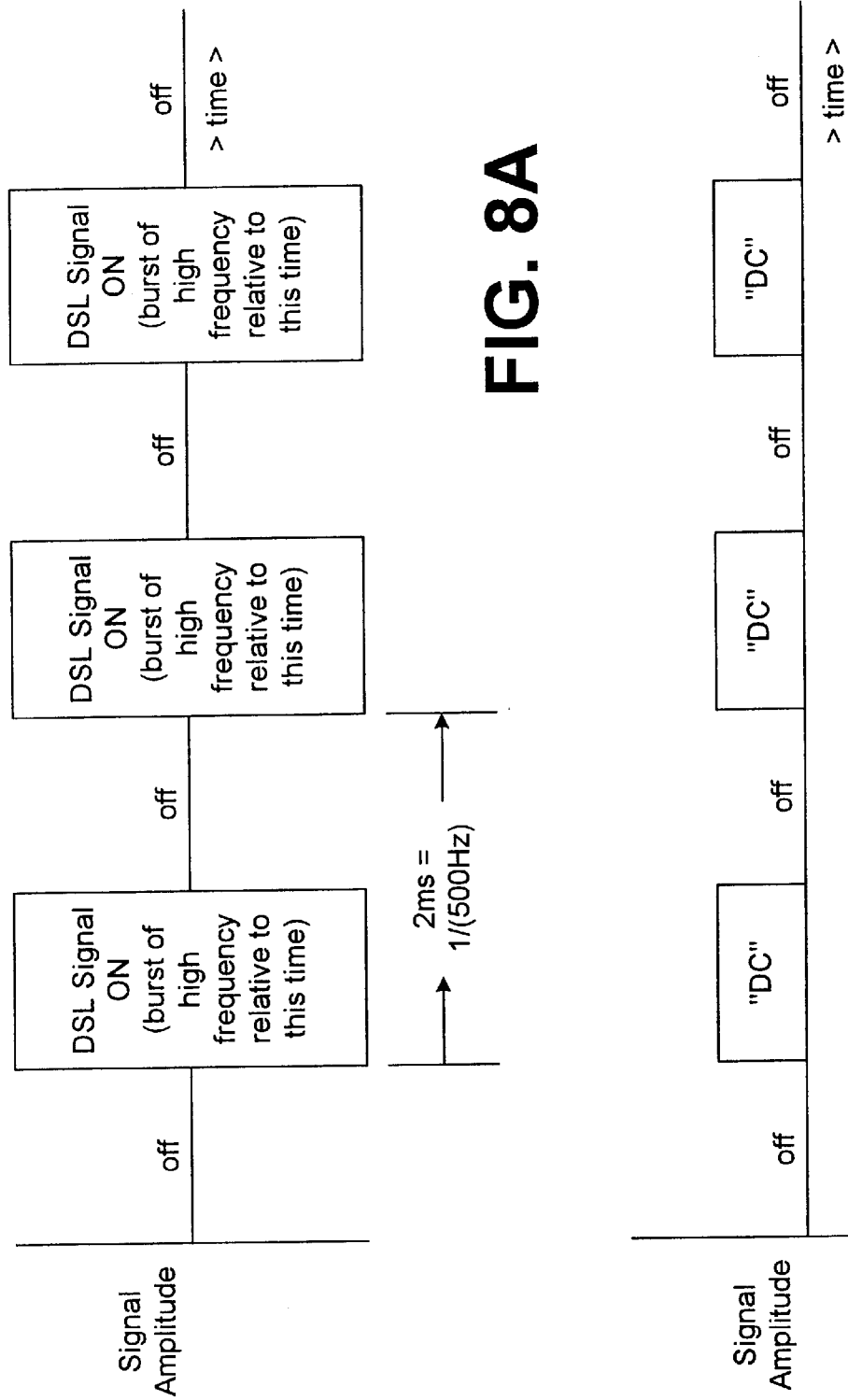
FIGS. 8A and 8B are simplified illustrations of the correlation of the DSL signal and the distortion components of that signal when the DSL signal is time-varied according to the present invention.

As an example, consider gating that occurs at a 500 Hz rate: the DSL signal is on for some duration less than 2 msec and off for the remainder of the 2 msec, such sequence repeating continuously, as illustrated in FIG. 8A. Each burst of DSL signal, as may have been filtered by a phone filter, causes via non-linear distortion in the telephone or dial modem a momentary change in the distortion component ("DC") signal at the telephone or dial modem interface during each burst, as illustrated in FIG. 8B. (FIG. 8B represents a simplified illustration of the distortion components. Typically, the distortion components will be more complex than the DC shown in FIG. 8B. The DC value may be expected to tend toward zero due to the highpass nature of the telephone or dial modem interface or contain higher frequency components. In addition, the polarity may be reversed.)

Figure 9:
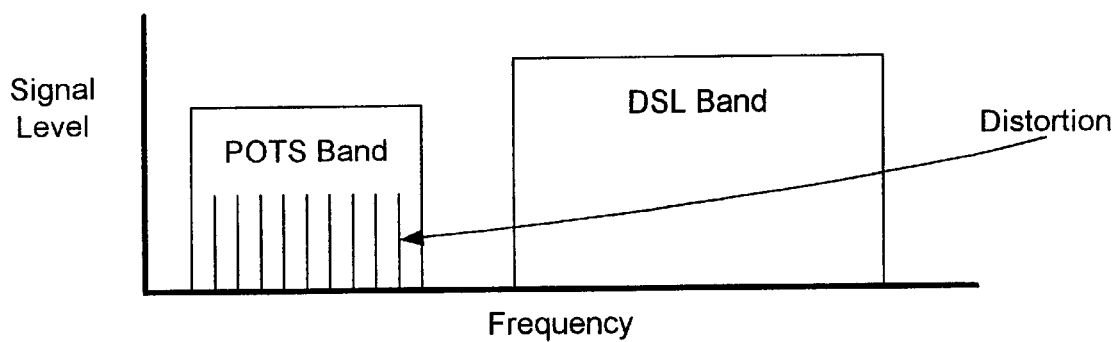
FIG. 9 is a simplified illustration of the signal level and frequency placement of POTS band signals, DSL band signals, and distortion on the two-wire communications channel of FIG. 2 when the DSL signal is time-varied according to the present invention.

The resultant distortion in this example differs very importantly from the distortion in the ordinary non-gated case, as illustrated with reference to FIG. 9. As illustrated in FIG. 9, the distortion components for the 500 Hz gating example include discrete line spectra at multiples of 500 Hz. Thus, wherein without gating the distortion is spread across the POTS band, with gating the distortion is concentrated at multiples of the gating frequency, which in this example is 500 Hz. The amplitude of the line spectra directly corresponds with the overall level of distortion.

It should be clear to those skilled in the art that the gating sequence may be correlated with the "DC" distortion components using conventional techniques to detect the presence and the magnitude of the distortion. For example, the magnitude of the POTS band signal at the DSL modem interface can be sampled and measured for a short time period after the beginning of every DSL signal burst, and measurement can be made over several or many bursts to accomplish correlation. It should also be clear that it is not necessary for the gating to be periodic. That is, even random DSL signal bursts allow detection and measurement of the distortion.

It should also be clear to those skilled in the art that such correlation techniques may be used to detect and to measure even very small levels of distortion and to do this in the presence of large POTS band signals.

As one example, immediately after an off-hook event, audio near-silence is most likely for a short time, so the background audio level should be perhaps −50 dBm, maximum. It should be possible to detect and measure distortion components above −70 dBm with a detection assurance on the order of around 12 dB. This implies correlation signal-to-noise ratio (SNR) improvement of 32 dB (40 times) is needed, requiring correlation of about 1626 samples. For 1 msec DSL bursts at a rate of 500 Hz, it is reasonable to obtain 8 independent samples per burst (0.001 * 8000 Hz) and thus 4000 correlation samples in one second. The above −70 dBm distortion could be measured in about 0.4 seconds.

As another example, the large distortion expected without a POTS filter with a large DSL signal level may result in distortion components at a level of at least −50 dBm, requiring correlation SNR improvement of 12 dB (16 times). This can be accomplished in perhaps 4 msec.

The above example implies that the DSL signal is both transmitted and detected at the user's DSL device, such as DSL device 38 in FIG. 2. However, the distortion is also visible at other DSL devices in the system, as is detection of the gating sequence. Thus, detection of the distortion can be accomplished at a DSL device remote from the transmitting DSL device, such as DSL device 33 in FIG. 2.

Figure 10:
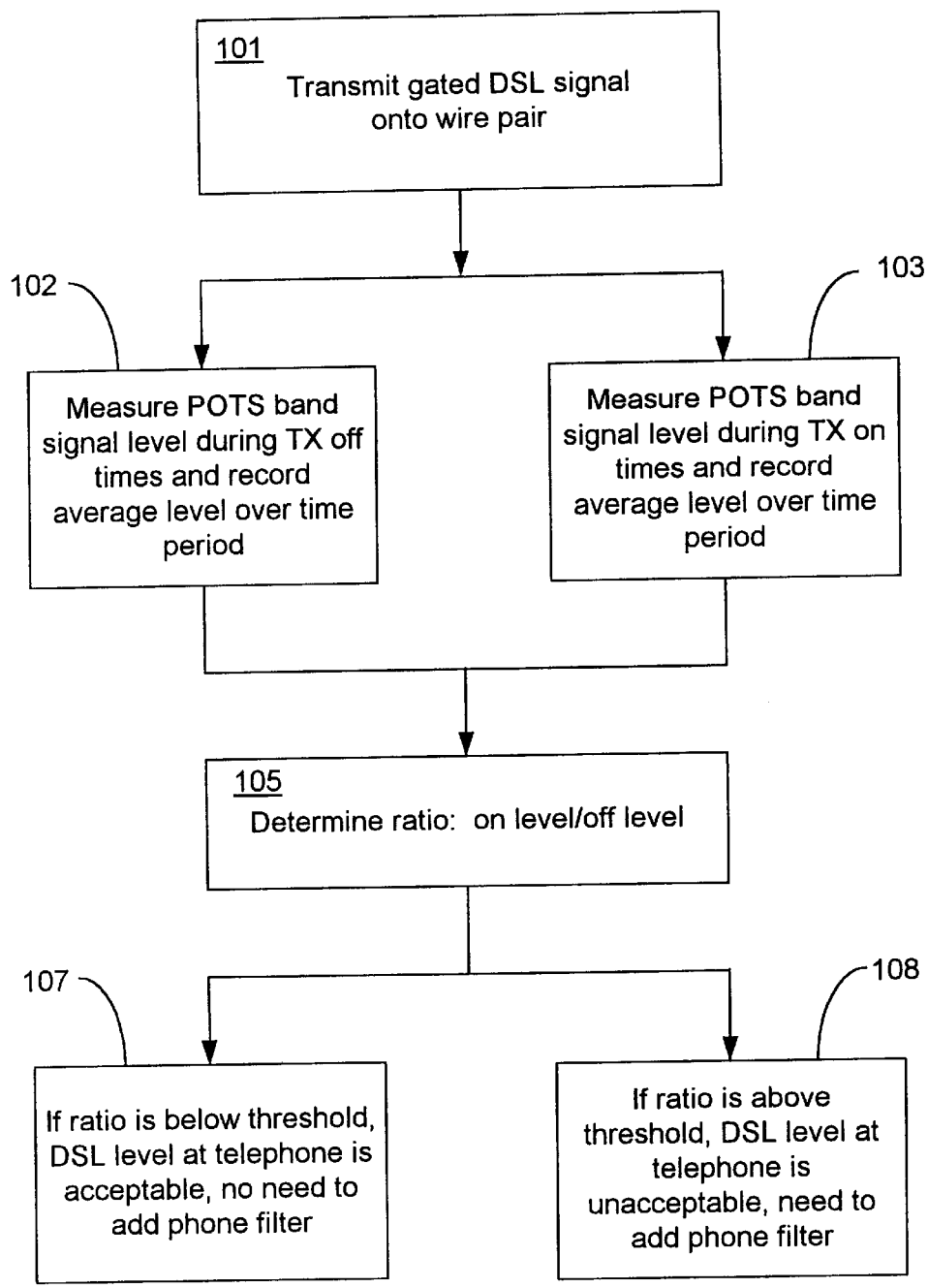
FIG. 10 is a flow chart illustrating the operation of the method and apparatus of the present invention for automatically detecting and measuring distortion in a DSL system in order to determine whether the distortion is within acceptable levels.

The flow chart of FIG. 10 shows the architecture, functionality, and operation of a possible implementation of the automatic distortion detection and measuring software of the present invention. In this regard, each block represents a module, segment, or portion of code, which comprises one or more executable instructions for implementing the specified logical function(s). It should also be noted that in some alternative implementations, the functions noted in the blocks may occur out of the order noted in FIG. 10.

As illustrated by the flow chart of FIG. 10, in a preferred embodiment the present invention functions as follows: in step 101, the DSL device transmits a gated DSL signal onto the communication channel. In step 102, the POTS band signal level is measured at the DSL device during the time in which the DSL signal is gated "off", and the average POTS band signal level during the "off" period is recorded. Similarly, in step 103, the POTS band signal level is measured at the DSL device during the time period in which the DSL signal is gated "on", and the average POTS band signal level during the "on" period is recorded.

Next, in step 105 the ratio of the POTS band signal level during the "on" period to the POTS band signal level during the "off" period is determined. The ratio determined in step 105 represents the degree to which the POTS band distortion is higher during DSL transmission. In steps 107 and 108, the ratio determined in step 105 is compared to a threshold level of acceptable audio noise, which is determined empirically, such as by audio sound measurements. This threshold indicates the ratio above which unacceptable distortion is expected from the POTS devices in the presence of the DSL transmit signal.

As illustrated in step 107, if the ratio determined in step 105 is below the threshold, the distortion caused by the DSL level at the telephone is acceptable, and there is no need to add a phone filter. On the other hand, as illustrated in step 108, if the ratio determined in step 105 is above the threshold, the distortion caused by the DSL level at the telephone is unacceptable, which indicates the need to add a phone filter.

It should be noted that if the DSL is not half-duplex, then the measurement illustrated in FIG. 10 will disrupt normal data communication, so it will be necessary to enter a test mode to make the measurements. If the DSL is half-duplex, communication need not be interrupted, although it may be preferable to enter a test mode in order to reduce test time. In either case, when the test mode is entered, the DSL is suitably configured and the appropriate measurements are made.

Thus, it is shown above that distortion can be detected and measured at either a local or remote DSL device to determine whether the distorting effects of the DSL device transmit signal warrant the incorporation of a phone filter at the interface to each POTS-type device in the system.

It should be emphasized that the above-described embodiments of the present invention, particularly any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. For example, it is possible to implement the present invention by time-varying the DSL signal in a periodic or in a random manner. Furthermore, it is possible to detect and measure the distortion either at the transmitting DSL device or at another DSL device in the system, which may be remotely located from the transmitting DSL device. All such modifications and variations are intended to be included herein within the scope of the present invention.

Therefore, having thus described the invention, at least the following is claimed:

1. A method for determining distortion on a communication channel to which is connected at least one conventional Plain Old Telephone Service (POTS) device and at least one digital subscriber line (DSL) device, comprising the steps of:
   varying an output signal of a first DSL device by gating said output signal on and off according to a time sequence to produce a time-varied DSL signal on the communication channel;
   measuring an audio frequency band distortion on the communication channel; and
   correlating the audio frequency band distortion on the communication channel to the time sequence of the time-varied DSL signal.

2. The method of claim 1, wherein the time sequence in said varying step is random.

3. The method of claim 1, wherein the time sequence in said varying step is periodic.

4. The method of claim 1, further comprising the steps of:
   determining a ratio of the magnitude of the audio frequency band distortion measured during such time as the output signal is gated on to the magnitude of the audio frequency band distortion during such time as the output signal is gated off; and
   comparing said ratio to a known threshold level of audio frequency band distortion.

5. The method of claim 1, wherein said gating is inherent in the output signal.

6. The method of claim 1, wherein said gating takes place during a distortion test mode.

7. The method of claim 1, wherein said step of measuring further comprises sampling and measuring the output signal.

8. The method of claim 1, wherein said step of measuring further comprises measuring the distortion at the output of the first DSL device.

9. The method of claim 1, wherein said step of measuring further comprises measuring the distortion at a second DSL device connected to the communication channel, said second DSL device being remote from said first DSL device.

10. An apparatus for determining distortion on a communication channel to which is connected at least one POTS device and at least one DSL device, comprising:
    means for varying an output signal of a first DSL device by gating said output signal on and off according to a time sequence to produce a time-varied DSL output signal on the communication channel;
    means for measuring an audio frequency distortion on the communication channel;
    means for coupling said measuring means to said varying means; and
    means for correlating the measured audio frequency distortion with the time sequence of said time-varied DSL output signal.

11. The apparatus of claim 10, wherein said varying means is a logic gate which turns the output signal on and off according to said time sequence.

12. The apparatus of claim 10, wherein said varying means varies the output signal of the first DSL device according to a random time sequence.

13. The apparatus of claim 10, wherein said varying means varies the output signal of the first DSL device according to a periodic time sequence.

14. The apparatus of claim 10, wherein said measuring means is a sample and hold circuit.

15. A computer readable medium having a program for determining distortion on a communication channel to which is connected at least one POTS device and at least one DSL device, the program comprising:
    means for varying an output signal of a first DSL device by gating said output signal on and off according to a time sequence to produce a time-varied DSL signal on the communication channel;
    means for measuring distortion on the communication channel in the audio frequency band; and
    means for correlating the distortion measured by said measuring means with the time sequence of said time-varied DSL signal.

16. The program of claim 15, wherein the time sequence of said time-varied DSL signal is varied randomly.

17. The program of claim 15, wherein the time sequence of said time-varied DSL signal is varied periodically.

18. The program of claim 15, wherein said measuring means is located at the first DSL device.

19. The program of claim 15, wherein said measuring means is located at a second DSL device connected to the communication channel, said second DSL device being remote from said first DSL device.

* * * * *

UNITED STATES PATENT AND TRADEMARK OFFICE
CERTIFICATE OF CORRECTION

PATENT NO. : 6,111,936
DATED : August 29, 2000
INVENTOR(S) : Bremer

It is certified that error appears in the above-identified patent and that said Letters Patent is hereby corrected as shown below:

a) Column 1, line 26, change "systems" to --system--.

b) Column 1, line 32, change "digital" to --Digital--.

c) Column 4, lines 50-51, change "dial is modem" to --dial modem--.

d) Column 5, lines 56-57, change "detection and is measuring logic" to --detection and measuring logic--.

Signed and Sealed this

Twenty-ninth Day of May, 2001

Attest:

NICHOLAS P. GODICI

*Attesting Officer*  *Acting Director of the United States Patent and Trademark Office*